Aug. 18, 1936.  D. S. BARROWS  2,051,024
CUSHIONING MECHANISM
Filed April 21, 1928  3 Sheets-Sheet 1
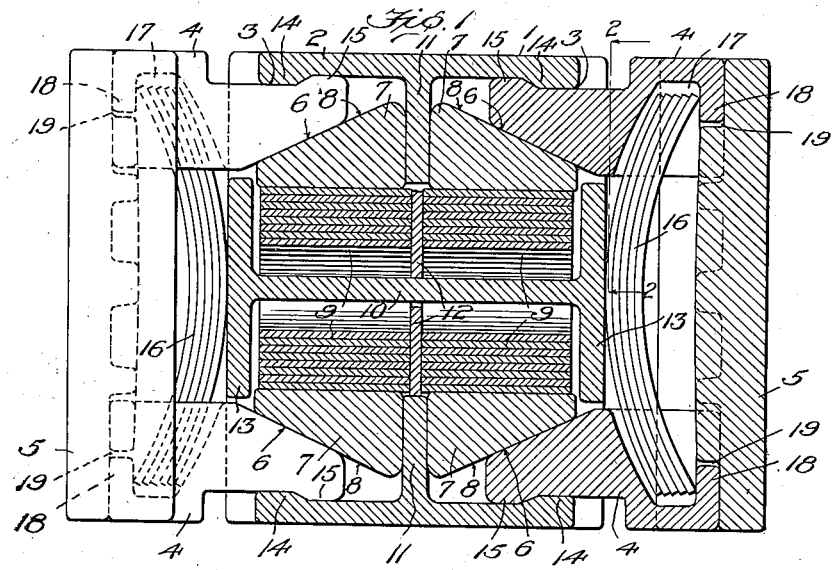
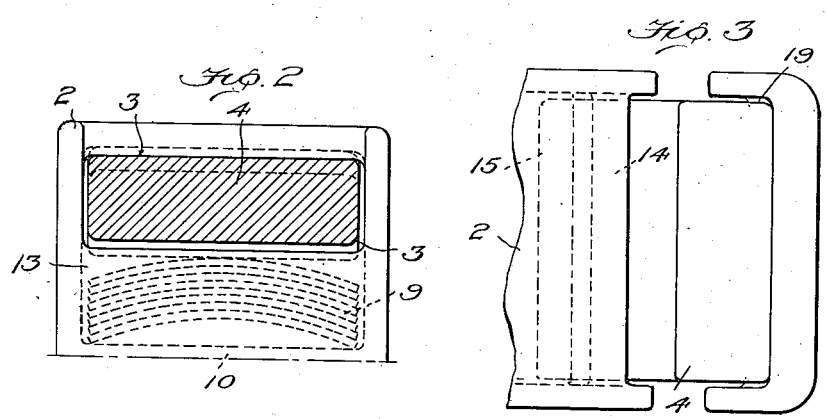
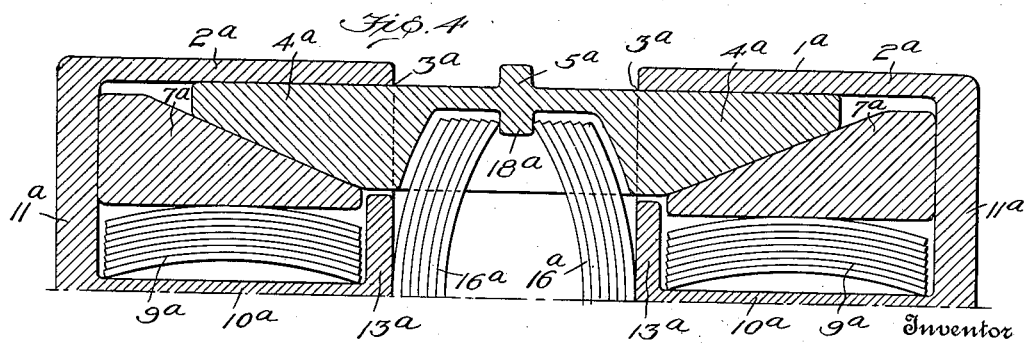
Inventor
Donald S. Barrows

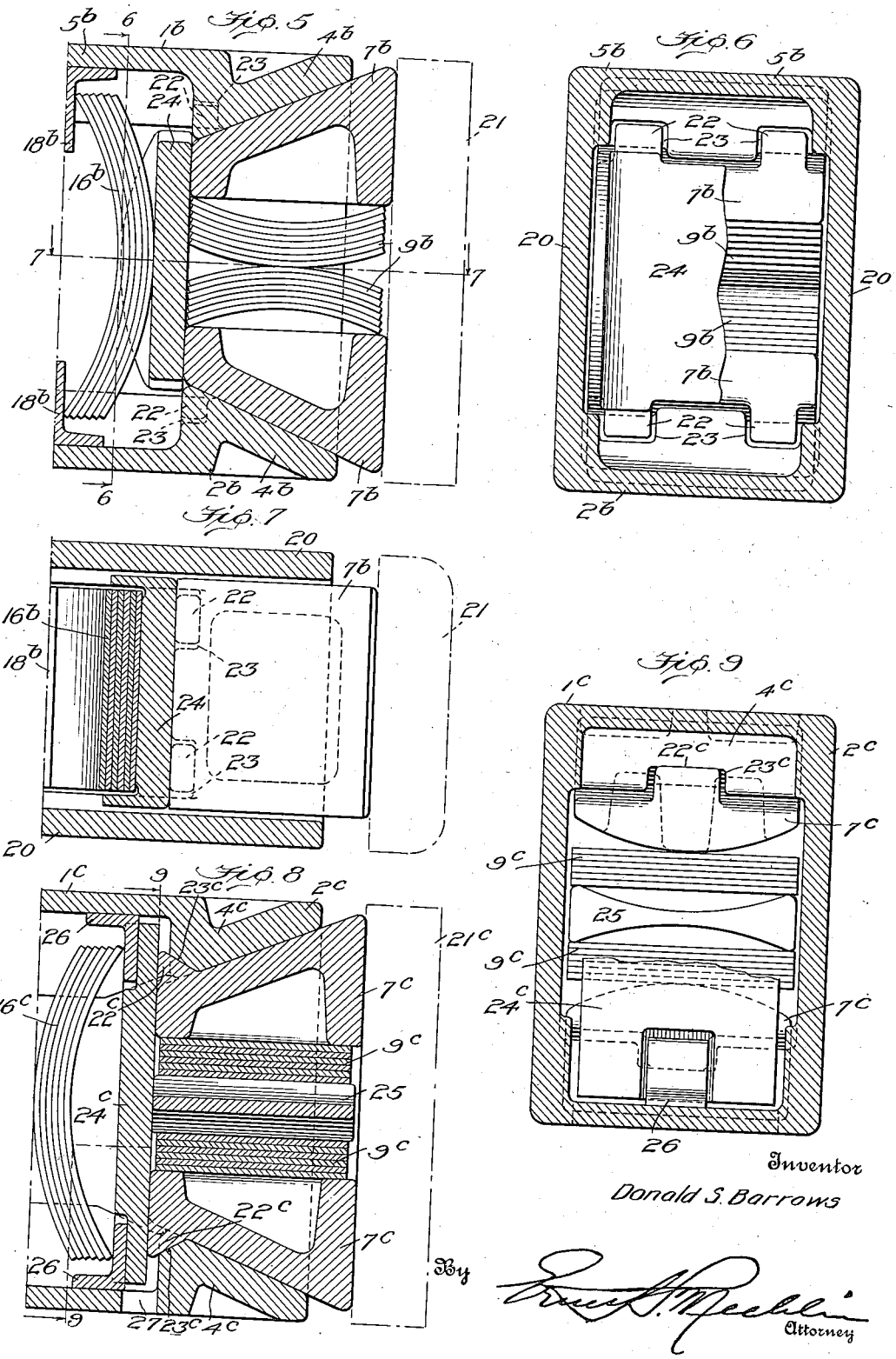

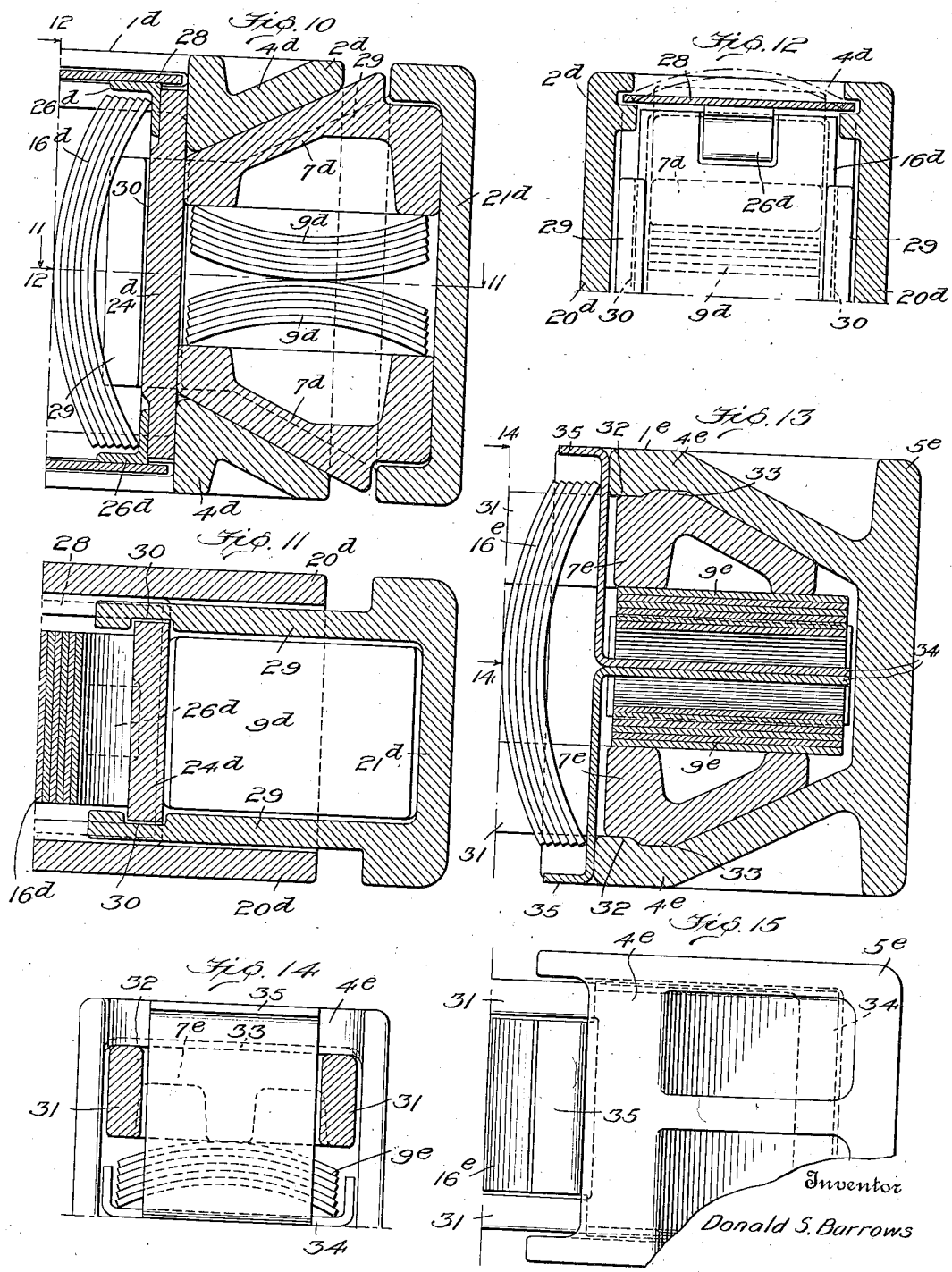

Patented Aug. 18, 1936

2,051,024

UNITED STATES PATENT OFFICE 2,051,024

CUSHIONING MECHANISM

Donald S. Barrows, Rochester, N. Y., assignor to The Gould Coupler Company, Rochester, N. Y., a corporation of Maryland Application April 21, 1928, Serial No. 271,904

19 Claims. (Cl. 213—30)

This invention relates to cushioning mechanism particularly adapted for use on railway rolling stock, and especially to a friction draft gear employing plate springs as the resilient means.

The principal object of my invention, generally considered, is to provide a friction draft gear using plate springs for holding the friction generating elements in engagement and for effecting release of the gear.

Another object of my invention is to provide a friction draft gear particularly adapted for use on railway cars constructed so as to have a high ultimate capacity and use plate springs as the resilient means therein so that the dimensions of the gear may be maintained within standard limits.

A further object of my invention is to provide cushioning mechanism for use with railway draft rigging involving a double-ended friction draft gear with curved leaf springs disposed between laterally movable friction shoes and a follower with wedge portions either integral or associated therewith, said wedge portions engaging the friction shoes and acting to move them together upon compression of the gear, and plate springs acting to separate the wedging means and the friction shoes to effect release of the gear.

Other objects and advantages of the invention relating to the particular arrangement and construction of the various parts will become apparent as the description proceeds.

Referring to the drawings illustrating my invention, the scope whereof is defined by the appended claims:

Figure 1 is a partial elevation or plan and partial longitudinal sectional view of one embodiment of my cushioning mechanism.

Figure 2 is a partial transverse sectional view on the line 2—2 of Figure 1, looking in the direction of the arrows.

Figure 3 is a partial plan or elevational view of the mechanism shown in Figure 1.

Figure 4 is a partial central longitudinal sectional view corresponding to Figure 1 but showing a modification.

Figure 5 is a partial central longitudinal sectional view corresponding to Figure 4 but showing another modification.

Figure 6 is a transverse sectional view on the line 6—6 of Figure 5, looking in the direction of the arrows.

Figure 7 is a horizontal sectional view on the line 7—7 of Figure 5, looking in the direction of the arrows.

Figure 8 is a partial longitudinal sectional view corresponding to Figure 5 but showing another modification.

Figure 9 is a transverse sectional view on the line 9—9 of Figure 8, looking in the direction of the arrows.

Figure 10 is a fragmentary longitudinal sectional view corresponding to Figure 5 but showing another modification.

Figure 11 is a longitudinal sectional view on the line 11—11 of Figure 10, looking in the direction of the arrows.

Figure 12 is a fragmentary transverse sectional view on the line 12—12 of Figure 10, looking in the direction of the arrows.

Figure 13 is a partial central longitudinal sectional view corresponding to Figure 5 but showing a still further modification.

Figure 14 is a fragmentary sectional view on the line 14—14 of Figure 13, looking in the direction of the arrows.

Figure 15 is a partial plan or elevational view of the form of my invention illustrated in Figure 13.

Referring to the drawings in detail, like parts being designated by like reference characters, and first considering the embodiment of my invention illustrated in Figures 1, 2 and 3, there is shown a cushioning mechanism 1 especially adapted for use as a railway draft gear and disposed with its long side either vertical or horizontal and connected with any usual or desired type of draft rigging. Said mechanism is double-ended and may be used with either end disposed forwardly or rearwardly, as will be understood. The particular form of mechanism now under consideration comprises a centrally disposed housing or carrier 2 provided with openings 3 in the ends thereof for receiving wedges or wedging means 4, which means, in the present embodiment, are associated and interlocked with end followers 5.

The wedging blocks 4 are provided with inclined friction surfaces 6 converging toward their outer or follower-adjacent ends. Engaging said wedge blocks are friction blocks or shoes 7, guided by walls of the carrier 2 and formed with correspondingly inclined friction surfaces 8 engaging the friction surfaces 6 on the wedge blocks 4. In order to hold said shoes in engagement with the wedge blocks to generate friction at the engaging friction surfaces, resilient means 9, in the present embodiment taking the form of curved plate springs, are provided between the inner surfaces of the friction shoes and the adjacent surfaces of a preferably flat central longitudinally extending partition 10 in the housing 2. Upon compression of the gear, the wedging blocks 4 act to force the shoes 7 together and flatten the leaf springs 9 against the partition 10, friction being generated not only between the engaging surfaces 6 and 8 but also between the inner transversely disposed surfaces of the shoes and the transverse webs or partition portions 11 of the housing, as well as between the outer surfaces of the wedge blocks 4 and the engaging surfaces on the walls of the housing 2. Said partition portions 11, and what are here shown as upper and lower walls of the housing, form generally T-shaped bracing means connecting the other housing side walls, and maintain the shoes in proper longitudinal position with respect to said housing. Transverse separator plates 12 are desirably provided between the groups of curved plate springs 9 to hold them in proper position. Undesired outward movement of the shoes 7 is prevented by the end walls 13 of the housing which form transversely opening pockets on the partition 10 for the springs 9.

In order to interlock the wedging means 4 with respect to the housing 2 cooperating lug or lip portions 14 and 15 are provided on the housing and wedging means, respectively, so that after assembly outward movement of said wedging means with respect to the housing is limited by engagement between the lug portions 14 and 15. In order to effect release of the mechanism direct or main spring resistances involving curved plate springs 16 are provided with the convex intermediate portions engaging the outer surfaces of the end walls of the housing and the free ends thereof received in pockets 17 in the outer ends of the wedging blocks 4 and normally engaging the outer flanged portions 18 defining said pockets, whereby not only are said wedge blocks 4 withdrawn from the housing after release of any compressive force applied to the gear but the capacity of the gear is increased by the force necessary to bend said springs. Each follower 5 and its associated blocks 4 thus form housing means for the associated springs 16, the friction surfaces 6 on the blocks 4 converging inwardly of said housing means. The outer ends of the blocks 4 are so formed that they interlock in corresponding depressions 19 in the end followers 5 whereby the parts are retained in proper relation with respect to each other.

Referring now to the embodiment of my invention illustrated in Figure 4 a form of gear 1a is disclosed in which instead of end followers a pair of end housings 2a are employed, said housings, as in the previous embodiment, being formed with longitudinal partitions 10a and end walls 13a apertured at 3a for receiving the wedge-shaped ends 4a of intermediate followers 5a. As in the previous embodiment, the wedge-shaped portions 4a are formed with inclined friction surfaces engaging correspondingly inclined friction surfaces on friction shoes 7a which engage the outer end walls 11a of the housings 2a and generate friction thereon in a manner similar to the generation of friction on the transverse partition portions 11 of the first embodiment. Curved leaf springs 9a are provided between partitions 10a and the inner sides of the friction shoes 7a for urging said shoes outwardly into engagement with the wedge portions of the intermediate follower.

For effecting release of the gear curved leaf springs 16a are provided with their convex intermediate portions engaging the end walls 13a of the housings and their ends engaging lugs 18a on the intermediate follower, whereby said springs are flattened upon compression of the gear and act to withdraw the wedge-shaped portions 4a from the housings 2a upon release of any compressive force applied to said gear. It will be understood that only one half of the gear is illustrated in Figure 4, the lower half being symmetrical with the part shown. Although no means interlocking the wedge-shaped portions 4a with the housings 2a are illustrated, it will be obvious that such interlocking may be provided for in a manner similar to that of the first embodiment.

Referring now to the embodiment of my invention illustrated in Figures 5, 6 and 7, a gear 1b is there shown corresponding with the embodiment of Figure 4 except that no housing separate from the wedge-shaped portions 4b is provided for the friction shoes 7b, that is, the sides of the intermediate follower 5b are joined by walls 20, thereby providing a housing 2b for the shoes 7b and associated curved plate springs 9b which urge them apart, the compression of said springs 9b being effected by movement toward each other of the combined intermediate follower and housing member 2b and the end followers 21, only one of which is illustrated as only half of the gear is shown.

In order to interlock the shoes 7b with respect to the housing 2b, said shoes are formed with outwardly extending lugs 22 on their inner ends engaging in corresponding notches 23 providing stop shoulders adjacent the inner ends of the wedge portions 4b, but short of the inner ends of the friction surfaces which extend on either side thereof. The inner ends of said shoes 7b engage an auxiliary follower 24 which in turn acts on sets or nests of curved plate release springs 16b, the ends of said springs acting on T-shaped abutment portions or separator means 18b provided adjacent the center of the housing 2b and preventing the adjacent edges of the sets from slipping past one another. Except as specifically described, the construction and operation of the gear 1b may correspond with that of the gear 1a.

Referring now to the embodiment of my invention illustrated in Figures 8 and 9, a gear 1c is there disclosed which is very similar to the gear 1b of the previous embodiment, that is, housing or casing means functioning as a combined intermediate follower and wedging member 2c is provided, the outer diverging wedge-shaped portions 4c of which are engaged by friction shoes or wedges 7c, the adjacent surfaces of which, however, are convex rather than flat and engage normally flat leaf springs 9c. In order to efficiently bend the leaf springs 9c a doubly concave longitudinally disposed follower 25 is provided between the springs 9c and upon compression of the gear said springs are forced to take a curved shape between the correspondingly curved portions on the friction shoes 7c and the follower 25.

As in the previous embodiment, interlocking between the friction shoes 7c and the wedge-shaped portions 4c is provided by the outstanding lugs 22c on the friction shoes 7c engaging in corresponding notches 23c in the inner ends of the wedge portions 4c. An auxiliary follower 24c is also provided between the inner ends of the friction shoes 7c and the curved plate release springs 16c, the outer ends of said follower engaging angular spring clips 26 which are in turn engaged by the ends of the springs 16c. In order to provide for the convenient insertion and removal of the auxiliary follower 24c, a laterally elongated aperture 27 is provided in the normally lower side of the housing 2c, which of course also serves to permit the escape of dirt, rust and material not desired in the casing 2c. Only one half of the gear is illustrated and it will be understood that the release springs 16c are supplemented by a corresponding set of springs curved the other way, and an end follower 21c may be used at each end of the gear as in the previous embodiment. Except as specifically described, the present embodiment may correspond with that of the previous embodiment.

Referring now to the embodiment of my invention illustrated in Figures 10, 11 and 12, a draft gear 1d is illustrated which is similar to that illustrated in Figures 8 and 9 in that a combined intermediate follower and housing 2d is provided with wedge portions 4d formed with friction surfaces engaging correspondingly inclined friction surfaces on the friction shoes 7d, the adjacent surfaces of which are outwardly pressed by curved plate springs 9d. As in the previous embodiment, auxiliary followers 24d are provided engaging the inner ends of the friction shoes 7d. Cooperating with the ends of said followers 24d are angular spring clips 26d, as in the previous embodiment, said spring clips being engaged by curved releasing springs 16d. In order to provide access to the interior of the casing or housing 2d for insertion and removal of the release springs and auxiliary followers, one or preferably two sides of said housing are closed by removable plates 28 which may be bowed, as indicated in Figure 12, for insertion and removal thereof.

In order to hold the parts in assembled relation, provision is made for interlocking the end followers 21d with respect to the auxiliary followers 24d instead of providing interlocking portions on the friction shoes 7d. In order to accomplish this purpose the end followers 21d are provided with longitudinally extending side walls 29 which telescope between the side walls 20d of the housing and the inner ends thereof are notched, as indicated at 30, for engaging the sides of the followers 24d.

Referring now to the embodiment of my invention illustrated in Figures 13, 14 and 15, a gear 1e is illustrated which is very similar to the gear 1 of the first embodiment. It differs, however, from said first gear in that the end followers 5e are formed with integral diverging walls functioning as wedge blocks 4e. The friction shoes 7e, at opposite ends of the gear, are joined by longitudinally extending strut portions 31 and are provided with correspondingly inclined friction surfaces engaging the inclined friction surfaces on the integral end followers and wedges 5e. Curved plate springs 9e are provided between the friction shoes 7e, as in previous embodiments, and interlocking lug portions 32 and 33 may be provided on the end followers and friction shoes, respectively, for holding the parts of the gear in assembled relation.

In the present embodiment the curved plate springs 9e are arranged with their convex sides outwardly in engagement with the shoes 7e. In order, therefore, to prevent the ends of said springs on opposite sides of the longitudinal center line of the gear from slipping over one another, separator plates 34 are provided between the sets of springs 9e, said plates being preferably extended outwardly transversely of the gear and formed with flanges 35 at their outer edges, whereby they are adapted to engage the release springs 16e, and hold the same in proper assembled relation with respect to the gear.

In the foregoing disclosure I have described several forms of my invention which differ in some details but it will be seen that all forms of the cushioning mechanism or draft gears disclosed involve laterally movable friction shoes outwardly spring-pressed by plate or leaf springs engaged by wedges or wedge-shaped portions of an associated follower or followers, plate springs being employed for effecting the release of the gear. In some of the embodiments means are provided for interlocking the parts so that the proper assembled relation is maintained even when the gear is separated from the associated rigging, and all forms are adapted to have such interlocking means. It will be appreciated that all of the parts are of such configuration that they may be readily manufactured, and on account of the combined friction and spring resistance all forms of the gear are adapted to have high capacity in proportion to the occupied space.

Having thus described my invention, I claim:

1. Cushioning mechanism comprising a unitary device having a pair of friction blocks at each end, resilient means urging said blocks laterally and outwardly, wedging means disposed outwardly of said friction blocks and formed with inwardly opening pockets, and two nests of curved plate springs with their ends housed in said pockets and each nest acting to separate a pair of friction blocks at an end of the mechanism and the corresponding wedging means to effect release of the gear.

2. Cushioning mechanism comprising a unitary device having a pair of friction blocks at each end, resilient means urging the blocks of each pair away from each other, wedging means disposed outwardly of said friction blocks and formed with pockets, a single nest of release plate springs acting to withdraw the wedging means from each pair of friction blocks and effect release of the gear, the ends of said nests of springs being housed in said pockets, and means interlocking said wedging means and friction blocks to hold the parts in assembled relation.

3. Cushioning mechanism comprising a housing formed with transverse web means having flat friction surfaces perpendicular to the longitudinal axis of the mechanism, inwardly movable friction shoes normally engaging said friction surfaces in said housing, resilient means pressing said shoes outwardly, a follower, and wedging means frictionally engaging the housing and disposed between said follower and friction shoes for moving said shoes toward each other and pressing them against said friction surfaces upon compression of the mechanism.

4. Cushioning mechanism comprising a housing, curved plate springs disposed adjacent the longitudinal center line of said housing, friction shoes engaging said plate springs and outwardly pressed thereby, said friction shoes forming friction surfaces converging outwardly from the housing, a follower, wedging means associated therewith and formed with correspondingly inclined friction surfaces engaging the friction surfaces on the friction shoes, whereby upon compression of the gear said wedging means forces the shoes together against the resistance of the springs, and springs acting directly on said housing and wedging means for effecting release of said mechanism.

5. Cushioning mechanism comprising a housing, a follower cooperating with each end of said housing, wedges associated with each follower, extending into, and frictionally engaging said housing, each wedge being formed with inclined friction surfaces, pairs of friction shoes with correspondingly inclined friction surfaces engaging the friction surfaces on the wedges, and curved plate springs disposed in said housing and engaging the inner surfaces of said friction shoes and urging them into engagement with the wedges, and transverse partitional webs in said housing disposed between and normally frictionally engaged by said shoes.

6. Unitary cushioning mechanism comprising housing means opening forwardly and rearwardly, a pair of friction blocks disposed at each end of and enclosed thereby, resilient means urging said blocks outwardly, wedging means disposed outwardly of said friction blocks, and a single nest of curved plate springs acting to separate each pair of friction blocks and the corresponding wedging means to effect release of the mechanism.

7. Cushioning mechanism comprising a housing, curved plate springs disposed adjacent the longitudinal center line of said housing, friction shoes engaging said plate springs and outwardly pressed thereby, said friction shoes forming converging friction surfaces, a follower, wedging portions directly actuated thereby and formed with correspondingly inclined friction surfaces engaging the friction surfaces on the friction shoes, whereby upon compression of the gear said wedging portions force the shoes together against the resistance of the springs, and plate springs acting longitudinally against said housing and wedging portions to effect release of the gear.

8. Cushioning mechanism comprising a housing, a follower cooperating with each end of said housing, wedge portions adjacent each follower, each wedge portion being formed with inclined friction surfaces, a partition in said housing formed with transversely opening pockets, pairs of friction shoes with correspondingly inclined friction surfaces engaging the friction surfaces of the wedge portions, and plate springs disposed in said pockets and engaging the inner surfaces of said friction shoes for urging them into engagement with the wedge portions.

9. Cushioning mechanism comprising an open-ended housing formed with inclined friction surfaces at each end, wedge blocks at each end of the housing with correspondingly inclined friction surfaces engaging the friction surfaces on the housing, resilient means disposed between said wedge blocks for urging them into engagement with the inclined friction surfaces on the housing, intermediate followers engaging the inner ends of said wedge blocks, said wedge blocks having notched extensions slidably receiving said followers and release springs disposed between said followers.

10. Cushioning mechanism comprising a pair of followers each formed with integral walls diverging from an end wall, providing inclined friction surfaces and presenting mechanism pockets opening toward one another, friction members each provided with spaced intermediate portions and end portions formed as friction shoes received in said pockets, resilient means received in said pockets between said members for urging them into engagement with the friction surfaces on the followers, plate release springs with end portions disposed between said spaced portions and acting on said followers for urging them apart, and means interlocking said followers to said friction members for holding the mechanism assembled.

11. Cushioning mechanism comprising housing means and a follower relatively movable toward and away from each other lengthwise of the mechanism, said housing means being formed with opposed interior inwardly converging friction surfaces, a pair of friction blocks having correspondingly inclined friction surfaces normally engaged with the friction surfaces on the housing means, curved plate springs opposing transverse approach of the blocks, a carrier for the plate springs, said carrier having walls including a transverse front end wall interposed between the follower and the front end of said springs, guide means for said friction blocks comprising walls of the carrier, and spring means within the housing means opposing inward movement of the carrier.

12. Cushioning mechanism comprising housing means having interior inwardly converging friction wedge surfaces, a carrier slidingly supported with respect to said housing means and serving for the transmission of actuating force, said carrier having longitudinally extending walls and a central longitudinally extending partition connecting said walls, a main spring resistance within the housing means opposing inward movement of the carrier, friction wedge blocks guided between said longitudinally extending walls, transversely extending means on and rigid with said carrier for guiding said blocks for lateral movement, said blocks being disposed on opposite sides of the partition and cooperating with the friction wedge surfaces of the housing means, and plate spring means interposed between the partition of the carrier and each friction wedge block and serving to oppose lateral approach of said blocks.

13. Cushioning mechanism comprising housing means with friction wedge surfaces, a follower movable toward and away from said housing means lengthwise of the mechanism, carrier means having spaced front and rear end walls and longitudinally extending wall portions comprising a central partition extending lengthwise of the carrier and dividing the same into two compartments, said front end wall serving to receive force from the follower, a main spring resistance within the housing means opposing inward movement of the carrier, a pair of friction wedge blocks on opposite sides of the partition, guided by and having frictional engagement with one wall of the carrier and both wedging and frictional engagement with the corresponding friction wedge surface of the housing means, and plate spring means, in the compartments of the carrier, interposed between the partition and the friction wedge blocks.

14. A carrier member for springs and friction blocks of cushioning mechanism, formed with walls, webs extending transversely to and connecting said walls, a flat partition connecting intermediate portions of said webs and walls, extending at an angle to all, and defining outwardly opening pockets therebetween and on either side of said partition, said pockets being adapted for receiving curved plate springs and friction blocks actuated thereby, and generally T-shaped bracing means connecting said walls.

15. Cushioning mechanism comprising a follower, wedge blocks associated therewith, a housing, resilient means urging said follower and wedge blocks away from said housing and acting on the adjacent outer surface of the latter, friction shoes laterally movable in said housing by said wedge blocks, and resilient means disposed between said friction shoes and stressed upon movement of the wedge blocks into the housing.

16. Cushioning mechanism comprising housing means and follower means relatively movable toward and away from each other lengthwise of the mechanism, said housing means having normally upper and lower wall portions providing opposed interior inwardly converging friction surfaces, stop shoulders provided on said housing means adjacent the inner ends of said friction surfaces, the wall portion of said housing means adjacent the inner end of the normally lower friction surface having a laterally elongated aperture, a pair of friction wedges having correspondingly inclined friction surfaces normally engaging the friction surfaces on the housing means and provided with laterally extending lugs normally engaging said stop shoulders to limit outward movement of said wedges, the lug on the lower wedge extending downwardly toward and overlying said aperture, plate springs opposing lateral approach of said wedges, release spring means within the housing means and oposing inward movement of said wedges, and an intermediate follower disposed between said release spring means and the inner ends of said wedges.

17. Cushioning mechanism comprising housing means and follower means relatively movable toward and away from each other longitudinally of the mechanism, said housing means having normally upper and lower wall portions providing opposed interior inwardly converging friction surfaces, inwardly diverging surfaces extending from inner portions of said friction surfaces and providing stop shoulders, a pair of friction wedges having correspondingly inclined friction surfaces normally engaging the friction surfaces on the housing means and laterally extending lugs provided with surfaces inwardly diverging to correspond and cooperate with said stop shoulders, the normally lower wall portion of said housing means, below the inner ends of said friction surfaces, adjacent the lower lug and below the stop shoulder cooperating therewith, being provided with an aperture, relatively short longitudinally of the mechanism, but laterally elongated to provide for the escape of undesired material from the inner portions of said inclined friction surfaces and stop shoulders, plate springs opposing lateral approach of said wedges, release spring means within the housing means and opposing inward movement of said wedges, and an intermediate follower disposed between said release spring means and the inner ends of said wedges.

18. Unitary cushioning mechanism comprising housing means opening forwardly and rearwardly, a plurality of friction blocks disposed adjacent each end of and housed thereby, nests of curved plate springs urging said blocks laterally outward, wedging means disposed outwardly of said friction blocks, and a nest of curved plate springs acting to urge said friction blocks away from their wedging means to effect release of the mechanism.

19. Unitary cushioning mechanism comprising housing means opening forwardly and rearwardly, a pair of friction blocks disposed adjacent each end of and housed thereby, nests of curved plate springs urging said blocks laterally outward, wedging means disposed outwardly of said friction blocks, other nests of curved plate springs acting to move said friction blocks longitudinally with respect to the wedging means to effect release of the mechanism, and means disposed midway between the ends of said housing means and between the concave sides of a pair of nests of longitudinally acting curved plate springs for separating said nests and preventing the adjacent edges from slipping past one another.

DONALD S. BARROWS.